United States Patent [19]

Bright

[11] 4,214,036

[45] Jul. 22, 1980

[54] CHANNEL-SHAPED SEALING, TRIMMING AND GUIDING STRIPS

[75] Inventor: Robert G. Bright, Viersen, Fed. Rep. of Germany

[73] Assignee: Draftex Development AG, Switzerland

[21] Appl. No.: 939,655

[22] Filed: Sep. 5, 1978

[51] Int. Cl.² .................... B32B 3/26; E06B 7/16; E06B 7/23

[52] U.S. Cl. .................... 428/358; 49/491; 52/716; 428/83; 428/122

[58] Field of Search .......... 52/716; 49/440, 441, 49/490, 496, 491; 428/122, 358, 83

[56] References Cited

U.S. PATENT DOCUMENTS

| | | | |
|---|---|---|---|
| 3,638,359 | 2/1972 | Kruschwitz | 49/490 |
| 3,706,173 | 12/1972 | Taylor | 52/716 |
| 3,993,819 | 11/1976 | Fewkes | 428/138 |
| 4,010,573 | 3/1977 | Andrzejewski | 428/122 |
| 4,030,245 | 6/1977 | Yolmans | 49/490 |

FOREIGN PATENT DOCUMENTS 1513729  6/1978  United Kingdom .

*Primary Examiner*—J. C. Cannon
*Attorney, Agent, or Firm*—Leydig, Voit, Osann, Mayer & Holt, Ltd.

[57] ABSTRACT

A channel-shaped sealing, trimming or finishing, or guiding strip comprises a carrier covered with flexible covering material, and is characterized in that relatively stiff or semi-rigid lengths of the carrier alternate along the length of the strip with relatively flexible lengths of the carrier, the relatively flexible lengths of the carrier being positioned at predetermined places where bends in the strip are required in use. The strip may be in the form of a closed loop.

10 Claims, 4 Drawing Figures

CHANNEL-SHAPED SEALING, TRIMMING AND GUIDING STRIPS

BACKGROUND OF THE INVENTION

The invention relates to channel-shaped sealing, trimming or finishing or guiding strips such as, for example, for fitting to flanges surrounding openings in vehicle bodies for trimming sealing or finishing purposes, and for use as channels for retaining and guiding window glass.

It is known to make such strips up into predetermined lengths, such as in the form of closed loops, for fitting into predetermined openings, such as door openings in vehicle bodies.

For ease of fitting, it is desirable that such predetermined lengths should be arranged such that they are at least partially pre-formed to match the contour of the opening. At the same time of course, it is desirable that they can be arranged to occupy minimal space when packed for storage or transport.

An object of the invention is to provide an improved channel-shaped sealing, trimming, or guiding strip.

BRIEF SUMMARY OF THE INVENTION

According to the invention, there is provided a channel-shaped sealing, trimming or finishing, or guiding strip, comprising a carrier covered with flexible covering material, relatively stiff or semi-rigid lengths of the carrier alternating along the length of the strip with relatively stiff lengths of the carrier, the relatively flexible length of the carrier being positioned at predetermined places where bends in the strip are required in use.

DESCRIPTION OF THE DRAWINGS

Channel-shaped strips embodying the invention will now be described, by way of example only, with reference to the accompanying diagrammatic drawings in which.

DESCRIPTION OF PREFERRED EMBODIMENTS

Figure 1:
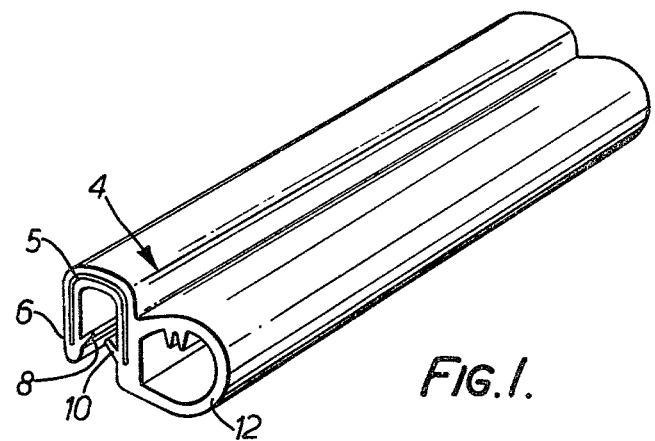
FIG. 1 is a perspective view of one of the strips.

As shown in FIG. 1, the channel-shaped strip 4 comprises a metal carrier 5 of generally channel-shape which is embedded in flexible covering material 6 such as plastics or rubber material. The material 6 is formed to provide gripping lips 8 and 10 which run along the inside walls of the channel. In use, the strip is placed over, and embraces, the flange surrounding an opening in a vehicle body, such as the door opening. When so positioned, the resilience of the carrier 5, together with the gripping ribs 8 and 10, ensure that the strip is firmly held in place on the flange, and it therefore carries out a trimming and draught or weatherproofing function. For this purpose, it may advantageously carry a soft sealing section 12 (such as made of soft cellular rubber) running along one outside wall of the channel.

There may be more, less, or no, gripping ribs on one or both inside walls of the channel, and there need not be equal numbers on the two sides.

The gripping ribs 8, 10 need not have the same hardness as each other or as the material 6.

The material 6, together with the material of the gripping ribs 8 and 10, and that of the sealing section 2 if provided, may be extruded, simultaneously, over the metal carrier 5 using known extruding processes.

In order to cope with curves at the corners of the vehicle body opening to which the strip is to be fitted, the strip has to be bent to match the curves. In accordance with a feature now to be described, the strip is made so that the metal carrier 6 is flexible at those positions where bends are required in order to match bends in the mounting flange or the like, but it is elsewhere stiff or semi-rigid. The strip for a particular vehicle body opening therefore comprises a series of straight or relatively straight lengths or sections in which the metal carrier 6 is relatively stiff or semi-rigid and these sections are interconnected by (generally shorter) lengths or sections in which the metal carrier 6 is made relatively more flexible so as to enable it to be bent by the vehicle body assembler to match the curves in the vehicle body opening.

It will be appreciated that there may be curves in the vehicle body opening flange in more than one dimension and sections in the strip at each of these positions would have a relatively flexible metal carrier 6.

Throughout the length of the strip, whether the carrier 6 is stiff (or semi-rigid) or relatively flexible, it still has sufficient resilience to enable it to help to hold the strip firmly on the flange.

The metal carrier may take any suitable form. For example, along those sections of the strip where it is required to be stiff or semi-rigid, it could consist of a metal channel. The channel could be provided with corrugations as disclosed in our British Pat. No. 1,513,729. In those sections of the strip where the carrier is required to be relatively flexible, it could comprise a series of U-shaped elements arranged side-by-side to form a channel, the elements being either separated from each other or connected to each other by flexible connecting links.

Figure 4:
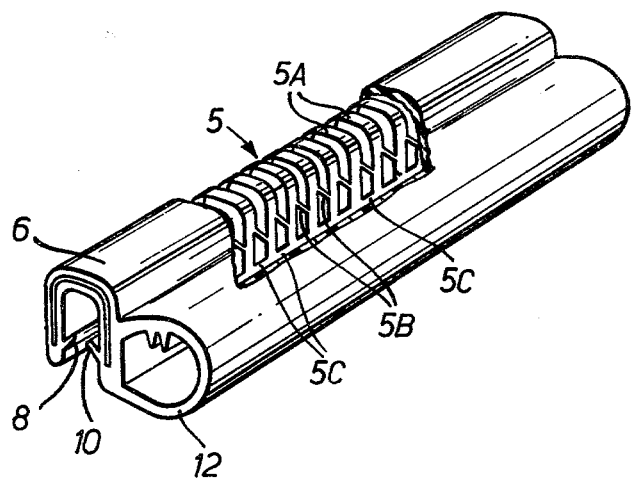
FIG. 4 is a perspective view corresponding to FIG. 1 but showing part broken away to reveal one particular form which the internal construction of the strip can take.

An advantageous form of carrier that could be used is shown in FIG. 4 and comprises a series of U-shaped elements 5A arranged side-by-side to form a channel, the elements being connected by short flexible connecting links 5B each of which extends from a point on one leg of an element to a point on the adjacent element but extending therebetween in an inclined direction. In addition, the elements are interconnected by additional connecting links 5C disposed at the distal ends (or near to the distal ends) of the legs of the elements. Using such a form of carrier, in those sections of the strip where the carrier is required to be relatively flexible, the additional connecting links 5C at or near the distal ends of the legs of the elements could be arranged to be broken (during the manufacturing process), but leaving the inclined links 5B unbroken, so as to give the carrier the required flexibility, while in those sections of the strip where the metal carrier is required to be stiff or semi-rigid, all the connections could be left unbroken so as to give the carrier the required characteristic.

It should be understood, however, that the foregoing are merely examples of various forms which the carrier can take.

Figure 2:
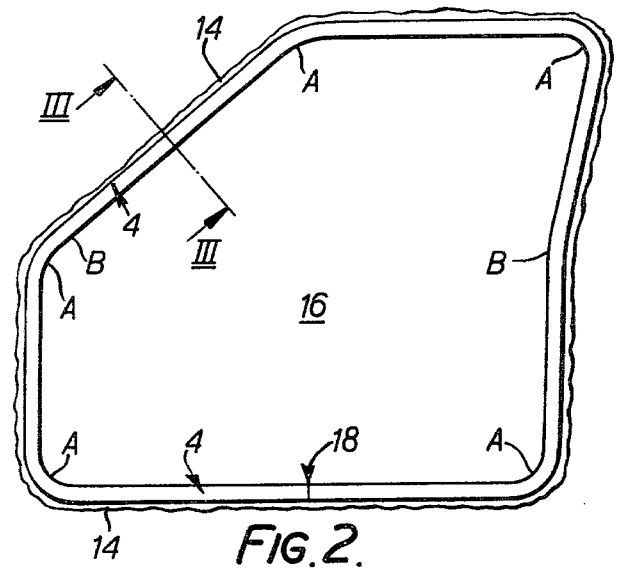
FIG. 2 shows, to a reduced scale, the strip of FIG. 1 in the form which it may take in use.
Figure 3:
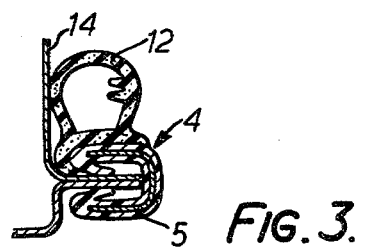
FIG. 3 is a section on the line III—III of FIG. 2 (but to an enlarged scale compared with FIG. 2)

FIG. 2 shows the strip formed (by the vehicle body assembler) in the required shape and fitted onto a flange 14 around a vehicle door opening 16. Curves occur at regions A and in each of these regions, the metal carrier 6 of the strip would be relatively flexible. In addition, there may be curves out of the plane of the drawing (regions B) and in these regions also the metal carrier would be arranged to be relatively flexible; in all other regions of the strip, however, the carrier would be relatively stiff or semi-rigid. The ends are joined at 18 in the usual manner as by butting together and joining the sealing section by adhesive.

The sections of the strip where the metal carrier is relatively stiff or semi-rigid are advantageous in that the stiffness or semi-rigidity of the carrier enables it to bridge over defects (such as welds and the like) in the flange so as to give a very neat overall appearance, and a fast assembly.

The sections of the strip where the metal carrier 6 is relatively flexible enables the strip to be compressed or stretched by a slight extent to take up tolerances in the shape of the flange. In addition, if desired, a short length of flexible metal carrier may be introduced for this purpose into one of the relatively straight lengths of the strip where the carrier is otherwise stiff or semi-rigid.

Strips made as disclosed may be packed and despatched to the vehicle body manufacturer in substantially straight lengths and then bent into the required shapes (to fit the intended vehicle body opening) at the positions which are predetermined by the positioning of the relatively flexible lengths of metal carrier, and this is of considerable advantage over forms of construction where the carrier in the entire strip is relatively stiff or semi-rigid so that the strip has to be formed into a closed or open loop frame and despatched in that form.

If required the strip can be supplied in a completed ring and because of the flexible areas in the ring, this would enable a more compact package for despatch purposes.

What is claimed is:

1. A channel-shaped sealing, trimming or finishing, or guiding strip, comprising
   channel-shaped flexible covering material, and
   a carrier completely embedded in the flexible material,
   the flexible covering material and the carrier forming a closed loop,
   relatively stiff and substantially incompressible lengths of the carrier alternating along the length of the strip with relatively flexible and compressible lengths of the carrier,
   the relatively flexible and compressible lengths of the carrier being positioned at predetermined places where bends in the strip are required in use.

2. A channel-shaped sealing, trimming or finishing strip for embracing and fitting onto a flange surrounding a predetermined opening, comprising
   a plurality of relatively stiff and substantially incompressible lengths of channel-shaped metal carrier, relatively flexible and compressible lengths of channel-shaped metal carrier being connected to but spacing apart endwise the relatively stiff and incompressible lengths of the carrier to form a closed loop,
   the relatively stiff and compressible lengths of metal carrier being in predetermined positions according to the position of the curves or bends in the said flange, and
   flexible covering material in which all the metal carrier is completely embedded.

3. A strip according to claim 1 or 2, including a relatively short length of the relatively flexible and compressible metal carrier interposed within one of the said lengths of the relatively stiff and substantially incompressible carrier.

4. A strip according to claim 2, in which the flexible covering material is extruded material.

5. A strip according to claim 2, in which the flexible covering material defines gripping ribs running along the length of the strip and respectively positioned on the inside facing walls of the strip.

6. A strip according to claim 1 or 2, in which at least the relatively flexible lengths of the carrier comprise a series of side-by-side U-shaped metal elements.

7. A strip according to claim 6, in which the elements are interconnected by flexible connecting links.

8. A strip according to claim 6, in which the relatively stiff lengths of the carrier also comprise a series of side-by-side U-shaped metal elements, and means relatively rigidly connecting these elements together.

9. A channel-shaped sealing, trimming or finishing strip for embracing and fitting onto a flange surrounding a predetermined opening, comprising
   a length of channel-shaped metal carrier connected to itself to form a closed loop sixed to match the length of the flange, the carrier comprising a series of U-shaped elements and relatively flexible connecting links connecting each element to the two adjacent elements,
   the U-shaped elements which form part of the carrier in regions between those parts of the said loop which are required to accommodate bends in the flange being additionally connected together by relatively inflexible connecting links which make the carrier relatively stiffer and less compressible over those regions than at the parts which are required to accommodate the bends in the flange, and
   flexible channel-shaped covering material in which the metal carrier is completely embedded.

10. A strip according to claim 9, in which each relatively inflexible connecting link connects the distal end of one leg of one of the elements to the distal end of the corresponding leg of one of the adjacent elements, and in which each relatively flexible connecting link extends from a point on one leg of one of the elements in a direction inclined to the direction of that leg to a point on the corresponding leg of one of the adjacent elements.

* * * * *

UNITED STATES PATENT AND TRADEMARK OFFICE
CERTIFICATE OF CORRECTION

PATENT NO. : 4,214,036
DATED : July 22, 1980
INVENTOR(S) : Robert G. Bright

It is certified that error appears in the above—identified patent and that said Letters Patent is hereby corrected as shown below:

Column 4, line 36, delete "sixed" and insert -- sized --.

Signed and Sealed this

Ninth Day of December 1980

[SEAL]

Attest:

SIDNEY A. DIAMOND

Attesting Officer

Commissioner of Patents and Trademarks